Feb. 8, 1944.    R. KINGSLAKE ET AL    2,341,385
WIDE-ANGLE LENSES
Filed Nov. 6, 1941
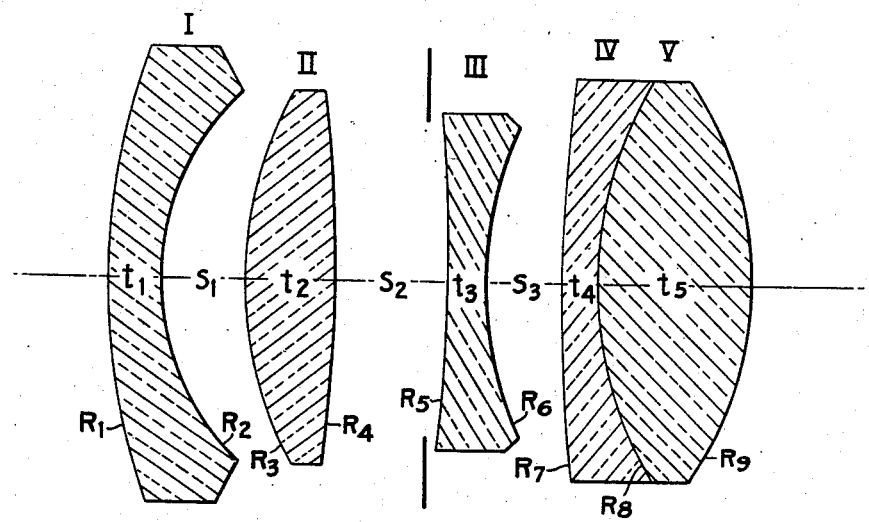
| F = 100 mm. | | | | f/3.5 |
|---|---|---|---|---|
| LENS | $N_D$ | V | RADII, mm. | THICKNESSES, mm. |
| I | 1.620 | 60.4 | $R_1$ = +81.9 | $t_1$ = 7.1 |
| | | | $R_2$ = +31.6 | $S_1$ = 10.6 |
| II | 1.697 | 56.1 | $R_3$ = +48.2 | $t_2$ = 11.4 |
| | | | $R_4$ = −172.6 | $S_2$ = 14.3 |
| III | 1.617 | 36.6 | $R_5$ = −410.4 | $t_3$ = 4.9 |
| | | | $R_6$ = +46.1 | $S_3$ = 9.7 |
| IV | 1.617 | 36.6 | $R_7$ = +362.3 | $t_4$ = 4.6 |
| V | 1.611 | 57.2 | $R_8$ = +48.9 | $t_5$ = 19.4 |
| | | | $R_9$ = −45.9 | BF = 101.7 |
RUDOLF KINGSLAKE
PAUL W. STEVENS
*INVENTORS*
BY *[signature]*
*ATTORNEY*

Patented Feb. 8, 1944

2,341,385

UNITED STATES PATENT OFFICE 2,341,385

WIDE-ANGLE LENS

Rudolf Kingslake and Paul W. Stevens, Rochester, N. Y., assignors to Eastman Kodak Company, Rochester, N. Y., a corporation of New Jersey Application November 6, 1941, Serial No. 418,038

5 Claims. (Cl. 88—57)

This invention relates to lenses and particularly to wide-angle photographic objectives.

The object of the invention is to provide a corrected photographic objective covering a wide angular field of more than thirty degrees from the axis and having a back focal length about as long as or longer than its equivalent focal length and which is economical to manufacture and convenient to use.

The use of negative supplementary lenses in front of positive lenses or lens systems of various types for increasing the working distance, i. e., back focus of the system, is widely known. Combinations of negative and positive members are also known in telephoto objectives and attachments and the reversed telephoto type of wide angle objective or attachment. In this type of wide angle lens it has heretofore been the usual practice to position the negative member near or in front of the front focal plane of the positive member and to use a photographic objective of some ordinary type as the positive member. Spacing the members at this great distance apart, however, results in lack of compactness and corresponding inconvenience in use.

Generally speaking all ordinary high quality objectives consist of a plurality of components of which the outer two are positive, and the outer two surfaces have positive power. Periscopic lenses have only the two positive components. Triplets and modified triplets have a negative inner component between simple or compound positive components. Other systems have two negative simple or compound inner components or a positive and a negative inner component. The present invention consists generally of placing a single negative component close to the front of any such objective system and then correcting the systems in cooperation so that neither one is separately corrected. These corrections are mainly for curvature of field and spherical aberration. This broad invention results in a lens system far better than any in which the positive objective is left fully corrected or in which the negative is spaced more than half the focal length of the positive member in front of the positive member.

As far as this broad invention is concerned the term "corrected" fully defines to any lens designer the necessary characteristic of the lens in a manner so that he can operate the invention. He can make a corrected lens letting the positive member go uncorrected, as novelly directed and he will reap the benefits of the invention even if not the full advantages of the preferred form thereof.

According to a specific form of the present invention, a wide-angle objective covering a field of over 30° from the axis, having a back focal length about as long as or longer than its equivalent focal length, and with the usual aberration corrections including correction of distortion is made up of a negative member consisting of a meniscus negative component concave toward the rear placed in front of and coaxial with a positive member of the general structure of that type of photographic objective comprising a negative component spaced between two positive components, the front negative member being spaced therefrom by less than half the focal length of the positive member.

We have found that an objective of this type can be corrected as a whole including correction for distortion and that it is more compact and convenient to use than the known type in which the two members are more widely separated.

The positive member has certain features common to most objectives of the type described whereby the front surface of the front component and the rear surface of the rear component are convex and preferably the more strongly curved glass-air surfaces of the respective components and whereby the middle component of the positive member is biconcave and preferably with its rear surface more strongly curved than its front surface.

However, the positive member differs from objectives of the type described in that the negative component has weaker curves. We have found that this is of advantage in securing a flat field, and that the reciprocal of the sum of the curvatures of the two glass-air surfaces of this component should be more than one-half the focal length of the positive member.

The front, middle, and rear components of the positive member constitute the second, third, and fourth components respectively of the complete objective, and the space between the negative and the positive member i. e. between the first and second components, is less than half the focal length of the positive member i. e. of the rear three components.

Preferably at least one component of the complete objective is compound. We have found that this structure is of great advantage in correcting the chromatic aberration. It may also be used by the designer for helping control the oblique spherical aberration and the distortion.

It is an advantage in reducing the zonal aberrations to use glasses of high index in the various components. We prefer that each component or, if compound, at least one element in the component, should have a refractive index greater than 1.60.

The accompanying drawing shows an objective according to the invention and constructional details for one embodiment.

The constructional details are as follows:

$f = 100$ mm.  $f/3.5$

| Lens | $N_D$ | V | Radii | Thicknesses |
|---|---|---|---|---|
| | | | mm. | mm. |
| I | 1.620 | 60.4 | $R_1 = +\ 81.9$ | $t_1 = 7.1$ |
| | | | $R_2 = +\ 31.6$ | $s_1 = 10.6$ |
| II | 1.697 | 56.1 | $R_3 = +\ 48.2$ | $t_2 = 11.4$ |
| | | | $R_4 = -172.6$ | $s_2 = 14.3$ |
| III | 1.617 | 36.6 | $R_5 = -410.4$ | $t_3 = 4.9$ |
| | | | $R_6 = +\ 46.1$ | $s_3 = 9.7$ |
| IV | 1.617 | 36.6 | $R_7 = +362.3$ | $t_4 = 4.6$ |
| V | 1.611 | 57.2 | $R_8 = +\ 48.9$ | $t_5 = 19.4$ |
| | | | $R_9 = -\ 45.9$ | $BF = 101.7$ |

In this example, the focal length of the positive member, which consists of the three rear components, is 67.6 mm. The third component in this case consists of a simple lens element, so that it has no surfaces other than the two glass-air surfaces. The curvatures of these surfaces are in absolute value 0.0024 and 0.0217 respectively. The numerical sum of these curvatures is 0.0241, and the reciprocal of this sum is 41.5. The focal length of the positive member is 1.63 times this value and 6.4 times the front airspace of the objective in accordance with the invention. The other features of the invention are immediately apparent from the table of constructional details.

Having described and illustrated our invention, we wish to point out that its scope is not limited to the example shown.

What we claim is:

1. A wide angle photographic objective comprising four coaxial airspaced components of which numbering from the front to the rear the first is a negative meniscus concave to the rear, the second is positive with its front surface convex, the third is biconcave, and the fourth is positive with its rear surface convex, in which the focal length of the rear three components taken together is greater than twice the airspace between the first and second components and less than twice the reciprocal of the numerical sum of the curvatures of the two glass-air surfaces of the third component.

2. An objective according to claim 1 in which the front surface of the second component and the rear surface of the third and fourth components are the more strongly curved of the glass-air surfaces of the respective components.

3. An objective according to claim 1 with at least one compound component.

4. An objective according to claim 1 in which each component has an element whose refractive index is greater than 1.6.

5. A wide angle photographic objective comprising a positive member whose outer surfaces have positive power and which consists of a plurality of components of which the outer two are positive and an inner one is negative with its more strongly curved bounding surface facing the rear of the objective and a negative member consisting of a meniscus negative component concave toward the rear and axially spaced in front of the positive member a distance less than half the focal length of the positive member, neither member being separately corrected for curvature of field and spherical aberration, and the objective as a whole being corrected for these aberrations.

RUDOLF KINGSLAKE.
PAUL W. STEVENS.